INVENTOR.
WILLIAM A. LYONS
BY
Barnes, Kisselle, Raisch & Choate

United States Patent Office 2,933,320
Patented Apr. 19, 1960

2,933,320

FIXTURE FOR SUPPORTING RING GEARS

William A. Lyons, Detroit, Mich.

Application September 22, 1958, Serial No. 762,636

16 Claims. (Cl. 279—1)

This invention relates to a fixture for supporting ring gears and more particularly to a fixture of this type which is designed to support the ring gear by engagement with the teeth thereof.

Heretofore, ring gear fixtures have been provided in the form of a generally circular plate having a plurality of ball pointed studs arranged thereon in fixed positions around a circle of predetermined diameter. With such fixtures, the ring gear is positioned teeth downward on the ball pointed studs; and if the studs are accurately located on the plate, the gear, in view of the radial taper of the gear teeth, is accurately located on the fixture plate.

While such fixture plates perform satisfactorily, nevertheless, their manufacture involves a considerable expense because a different fixture plate is required for every different size pitch of gear teeth, even though the ring diameter of the ring gear may be the same. In addition, the operation of accurately locating the ball pointed studs in a permanently fixed position on the plate is time consuming and expensive.

It is an object of the present invention to provide a fixture plate of the type described that can be manufactured economically and in which the ball pointed studs can be readily adjusted to different positions to accommodate gears of different pitch.

More specifically, this invention contemplates a ring gear fixture in which the ball pointed studs are arranged such that they can be shifted circumferentially and locked in position within one or more circular grooves on the plate; and thus, a single fixture plate can be used for supporting a whole series of gears of the same diameter but having a different pitch and also gears of different diameters.

Other objects and features of the invention will be apparent from the accompanying disclosure and in the drawing, in which.

Figure 1:
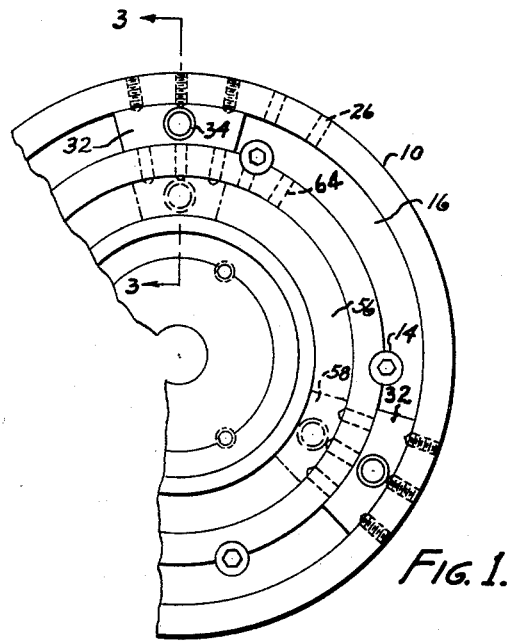
Fig. 1 is a fragmentary plan view of a ring gear fixture embodying the present invention.
Figure 2:
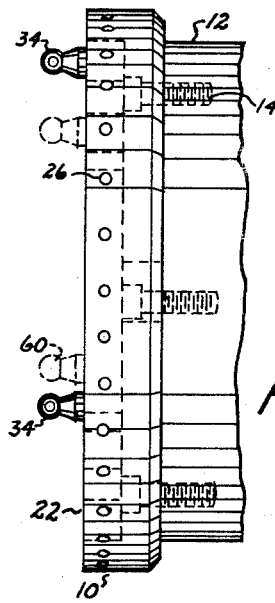
Fig. 2 is a side elevational view of the fixture.

The fixture generally includes a base plate 10 that is adapted to be mounted on a supporting base 12 as by socket head screws 14. Plate 10 is of circular shape and spaced slightly inwardly from the outer peripheral edge thereof, it is provided with a circular groove 16. Groove 16 has concentric inner and outer side walls 18 and 20 which are perpendicular to the top flat face 22 of plate 10. Groove 16 has a bottom wall 24 that is parallel to the top face 22 of plate 10. In other words, groove 16 is rectangular in radial section.

At regularly spaced intervals around the periphery of plate 10, the plate is provided with radially extending tapped holes 26 which, at their inner ends, open into the outer side wall 20 of groove 16. These tapped holes are arranged to receive locking screws 28 which are provided with a cone point 30.

Figure 3:
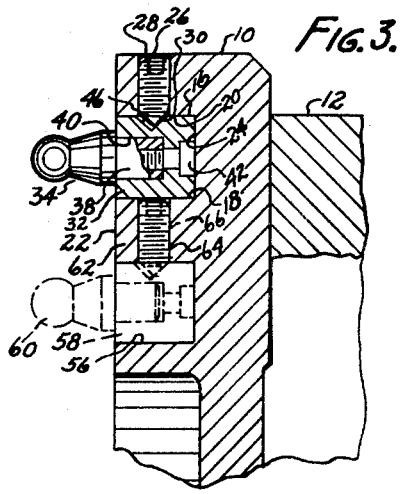
Fig. 3 is a fragmentary sectional view taken along the line 3—3 in Fig. 1.
Figure 5:
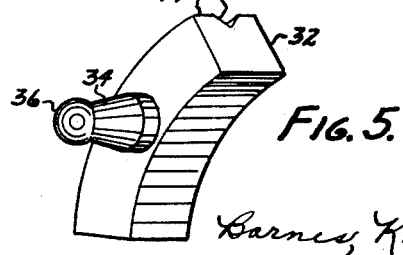
Fig. 5 is a perspective view of one of the adjustable shoes employed on the fixture of the present invention.

Within the annular groove 16, there is arranged a plurality of shoes 32 which are in the form of arcuate segments of rectangular shape in radial section. Shoes 32 are dimensioned to have a close fit in groove 16. On each shoe 32, there is mounted an upright stud 34 having a precision ground, spherically shaped upper end 36. The inner or lower end of stud 34 has a reduced shank 38 having a close fit with a central bore 40 in shoe 32. Stud 34 is securely mounted on shoe 32 by a screw 42 which threads upwardly into the reduced shank 38 of the stud from the bottom side of shoe 32 (Fig. 3).

The outer cylindrical wall 44 of each shoe 32 is formed with a circumferentially extending V-shaped notch 46. The apex of notch 46 is offset slightly in a direction towards the top face 22 of plate 10 with respect to the axes of screws 28 when the shoe is seated in groove 16. The spacing of the tapped holes 26 is determined in relation to the arcuate extent of each shoe 32 so that there are three screws 28 engageable with each shoe 32, regardless of the circumferential spacing of the shoes. When the screws 28 which are aligned radially with one of the shoes are tightened, the cone points 30 engage the lower face of the V-shaped notch 46 so as to urge the shoe in a direction radially inwardly against the inner wall 18 and axially downwardly against the bottom wall 24 of the groove. In this manner, each shoe 32 can be very securely located in groove 16.

In using the fixture plate of this invention, when it is desired to arrange the ball pointed studs 34 in proper circumferential relation for supporting a gear having a predetermined number of teeth, a plurality of shoes 32, at least three in number, are loosely arranged in groove 16 with generally equal circumferential spacing. Thereafter, one of the group of gears 48 to be supported on the fixture, preferably a master gear, is positioned teeth downward on the studs. Since the shoes 32 at this time are free to shift circumferentially in groove 16, the shoes will be located in their proper position by the interengagement of the spherically shaped heads 36 with the grooves between successive teeth 50 on the gear. The gear is pressed downwardly towards the top face 22 of plate 10 so as to insure the proper location of each of the studs 34. It will be appreciated that in view of the radial taper of the teeth 50 of the ring gear, the gear will automatically seat itself solidly on studs 34 in a predetermined correct position. With the gear thus seated, the screws 28 adjacent each shoe 32 are then tightened and the fixture plate is thus conditioned for supporting in accurate position other gears of the same pitch.

Figure 4:
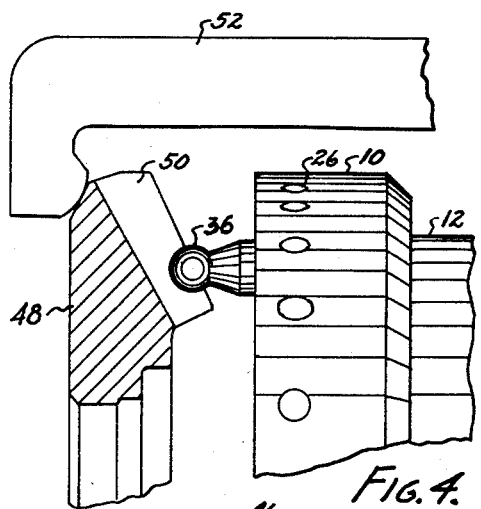
Fig. 4 is a fragmentary side elevational view, partly in section, showing the manner in which a ring gear is supported on the fixture plate of the present invention.

The fixture plate can be used for gauging purposes or even for holding ring gears to permit grinding the I.D. or the back face of the gear or any subsequent machining operation. In order to rigidly hold a ring gear on the fixture plate, suitable clamps such as illustrated at 52 may be provided on the base support 12 for clamping the gears on the ball pointed studs 34 as shown in Fig. 4. If it is desired to change the setting of the studs 34 to accommodate a group of ring gears having a different pitch than the ring gears previously supported on the fixture, it is merely necessary to loosen screws 28 and again follow the procedure described above with one of the gears of different pitch. The studs 34 will, of course, be replaced with different studs, the diameters of the ball ends of which correspond with the pitch of the teeth of the gear to be mounted on the fixture.

If desired the base plate 10 may be provided with one or more additional circular grooves concentric with and spaced radially inwardly of groove 16. One such additional groove is illustrated at 56. Likewise additional arcuate shoes 58 having ball pointed studs 60 fixed thereon are provided for seating in groove 56. The annular rib 62 between grooves 16 and 56 is provided with a series of radially extending tapped holes 64 to receive cone pointed screws 66 for locking shoes 58 in groove 56 as described above in connection with screws 28 and shoes 32. The additional grooves such as illustrated at 56 accommodate the fixture plate for gears of different diameters.

Thus, it will be seen that I have provided a ring gear fixture which incorporates many advantages over conventional fixtures presently employed for supporting ring gears. The use of a plurality of shoes 32, each provided with a ball pointed stud 34, that are circumferentially adjustable in the circular groove 16 not only simplifies the manufacture of the fixture, but also enables the use of a single fixture for mounting or checking gears of different pitch, this is the primary feature of the fixture. In addition, the provision of a plurality of circular grooves on the plate enables its use for gears of different diameters.

I claim:

1. A supporting fixture for ring gears comprising a base having a top face and a circumferentially continuous annular groove in said top face, a plurality of shoes mounted in said groove for circumferential shifting movement therein and having a close fit therewith, each of said shoes having an upright stud fixed thereon, the upper end of each stud being shaped to engage between successive teeth on a ring gear and means on said base for fixedly clamping said shoes in a predetermined circumferentially spaced relation within said groove.

2. A supporting fixture as called for in claim 1 wherein said groove is of rectangular shape in radial section and said shoes are of corresponding cross sectional shape, said groove being truly circular in plan and said shoes comprising arcuate segments having inner and outer radii corresponding with the inner and outer radii of said groove.

3. A supporting fixture as called for in claim 1 wherein said clamping means comprises a plurality of circumferentially spaced and radially arranged screws on said base projecting into said groove and adapted, when tightened, to engage with said shoes to lock the shoes in fixed position within the groove.

4. A supporting fixture for ring gears comprising a base having a circular top face, said top face being provided with a circumferentially continuous annular groove spaced radially inwardly from the outer periphery thereof and concentric therewith, a plurality of shoes in the form of small arcuate segments seated in said groove and shiftable circumferentially therein, each of said shoes having means projecting axially upwardly of the top face of the base and adapted for interengaging with a ring gear between successive teeth thereof and means for fixedly clamping said shoes in a predetermined circumferentially spaced relation in said groove.

5. A supporting fixture as called for in claim 4 wherein said groove is fashioned with radially spaced concentric cylindrical side walls and each of said shoes is provided with radially inner and outer walls of segmental cylindrical shape having substantially the same radii as the inner and outer side walls of said groove.

6. A supporting fixture as called for in claim 4 wherein said groove has a bottom wall lying in a plane perpendicular to the planes of said side walls and said shoes are provided with a bottom face perpendicular to the side walls thereof.

7. A supporting fixture as called for in claim 4 wherein said top face of said base comprises the end face of a cylindrical portion of said base, said cylindrical portion having an axial extent at least as great as the depth of said groove and said clamping means comprise a plurality of radially extending, circumferentially spaced screws around the periphery of said cylindrical portion which may be advanced into said groove to engage the shoes therein.

8. A supporting fixture for ring gears comprising a plate of cylindrical shape and having a relatively flat top face, a circumferentially continuous annular groove in said top face located slightly inwardly from the outer periphery of said plate, said groove having radially spaced, concentric inner and outer side walls, a plurality of shoes in the form of arcuately shaped segments seated in said groove with a close fit and shiftable circumferentially therein, each of said shoes having an axially extending stud thereon, the outer end of which is adapted to interengage a ring gear between successive teeth thereon, the portion of said plate between said groove and the outer periphery thereof having a plurality of radially extending tapped holes therein which are regularly spaced around the circumference thereof, said tapped holes, at their inner ends, opening into said groove and a plurality of screws in said tapped holes which are adapted to be tightened to engage the shoes that are aligned radially with the tapped holes.

9. A supporting fixture as called for in claim 8 wherein each shoe has a cylindrical socket therein, each stud having a cylindrical shank removably engaged within said cylindrical socket and means for releasably locking said shanks of the studs in the sockets on the shoes.

10. A supporting fixture as called for in claim 8 wherein the circumferential spacing of said tapped holes and the arcuate extent of said shoes are related such that each shoe is engageable by at least three screws.

11. A supporting fixture as called for in claim 8 wherein each shoe has radially spaced inner and outer side walls, the outer side wall being provided with a circumferentially extending notch therein, the notches in said shoes being arranged to register with the screws around the periphery of the plate.

12. A supporting fixture as called for in claim 11 wherein said screws are fashioned with a cone point and are adapted to engage said notches such that when the screw is tightened, the shoes are urged radially and axially inwardly of said groove.

13. A supporting fixture as called for in claim 12 wherein the notches in said shoes are generally of V shape, the apex of the V being slightly offset in the direction towards the top face of said plate relative to the apex of the cone point screw.

14. A supporting fixture for ring gears comprising a base having a top face and a plurality of concentric, circumferentially continuous annular grooves in the top face, a plurality of shoes adapted to be mounted in each of said grooves for circumferential shifting movement therein and having a close fit therewith, each of said shoes having an upright stud fixed thereon, the upper end of each stud being shaped to engage between successive teeth on a ring gear, and means on said base for fixedly clamping said shoes in a predetermined circumferentially spaced relation within said grooves.

15. A supporting fixture as called for in claim 14 wherein said grooves are of rectangular shape in radial section and said shoes are of corresponding cross sectional shape, the grooves being truly circular in plan and the shoes comprising groups of arcuate segments having inner and outer radii corresponding with the inner and outer radii of said grooves.

16. A supporting fixture as called for in claim 15 wherein said clamping means comprises a plurality of groups of circumferentially spaced and radially extending screws on said base, each group of said screws projecting into one of said grooves and adapted, when tightened, to engage with the shoes in said groove to lock the shoes in fixed position therein.

References Cited in the file of this patent

UNITED STATES PATENTS

| | | |
|---|---|---|
| 1,021,011 | Sponable | Mar. 26, 1912 |
| 2,783,050 | Garrison | Feb. 26, 1957 |